United States Patent [19]
Guertler

[11] Patent Number: 5,572,009
[45] Date of Patent: Nov. 5, 1996

[54] METHOD FOR ENCODING A MACHINE-READABLE MEASUREMENT SCALE

[75] Inventor: Klaus Guertler, Jena, Germany

[73] Assignee: Carl Zeiss Jena GmbH, Jena, Germany

[21] Appl. No.: 326,001

[22] Filed: Oct. 19, 1994

[30] Foreign Application Priority Data

Nov. 8, 1993 [DE] Germany ............... 43 38 038.7

[51] Int. Cl.⁶ .................................................. G06V 19/06
[52] U.S. Cl. ........................................................ 235/494
[58] Field of Search ................................. 235/494, 462, 235/454; 371/49.1; 341/70, 53

[56] References Cited

U.S. PATENT DOCUMENTS

| | | | |
|---|---|---|---|
| 4,084,511 | 5/1977 | McJohnson | 340/172.5 |
| 4,605,846 | 8/1986 | Duret et al. | 235/468 |
| 4,644,143 | 8/1987 | McJohnson et al. | 235/385 |
| 4,707,612 | 11/1987 | Martin | 250/568 |
| 5,298,731 | 3/1994 | Ett | 235/494 |
| 5,446,791 | 8/1995 | Wooley et al. | 235/494 X |

FOREIGN PATENT DOCUMENTS

| | | | |
|---|---|---|---|
| 0290140 | 4/1988 | European Pat. Off. | 235/494 |
| 0441963 | 1/1990 | European Pat. Off. | 235/494 |
| 3424806 | 7/1984 | Germany | 235/494 |
| 3739664 | 11/1987 | Germany | 235/494 |
| 6025413 | 2/1985 | Japan | 235/494 |
| 8401027 | 3/1984 | WIPO | 235/494 |

*Primary Examiner*—Donald T. Hajec
*Assistant Examiner*—Le, Thien Minh
*Attorney, Agent, or Firm*—McAulay Fisher Nissen Goldberg & Kiel, LLP

[57] ABSTRACT

A method for encoding a machine-readable scale in which a BP code is formed from a P code with length k and whose half-bits and whole bits are alternately provided with light and dark coloring. The method comprises the steps of forming an additional coding by means of a half-bit-by-half-bit comparison of the colors of the half-bit of the BP code of length k with the colors of the bits of a P code of length k+1, and further including the steps of assigning a light or dark coloring to the bits corresponding to their significance, and placing an additional bar with a complementary color of the respective half-bit of the BP code of length k in the center of the respective half-bit alternatively, depending on the agreement or disagreement of colors.

6 Claims, 1 Drawing Sheet

METHOD FOR ENCODING A MACHINE-READABLE MEASUREMENT SCALE

BACKGROUND OF THE INVENTION a) Field of the Invention

The invention is directed to a method for encoding machine-readable measurement scales. Encoded scales have many uses in measurement technology. The method can be used in geodetic instrument engineering to produce a digital and consequently machine-readable level indicator. Other possible applications are in angle and distance measurement.

b) Background Art

A measurement scale must have suitable graduations which can be read visually or mechanically in order for the position of a mark on the scale to be detected. For visual reading, graduations are commonly provided with written numerals, whereas different bar codes are used for mechanical reading. In bar codes, the information content can be encoded by color, bars or spaces, by the dimension of the bars and spaces or by the color and dimension. The code can be arranged on the scale in the longitudinal direction (DE 3739664, DE 3424806), transverse direction (EP 0290140, JP 60-25413) or in both the longitudinal and transverse direction.

The code can be produced by using selected generator polynomials of pseudostochastic bit sequences. A prominent characteristic of these sequences consists in that every possible number can only occur once within their periodicity.

The information content of a pseudostochastic code can be increased by converting this code by means of a biphase code as is indicated in DE 3739664. In so doing, for example, an interval on the scale of length 1 with uniform color is allocated to every 1-bit and two intervals, each having a length ½, with dark and light color are assigned to every 0 bit. At every bit border, the color changes from light to dark or from dark to light.

The length of scale $L_M$ is given by the following equation:

$$L_M = (2^k + k - 2) L_B \quad (1),$$

where k is the number of bits required to encode a number and $L_B$ is the length of the individual code element.

When a scale encoded in this way is read by an optical system, the largest and smallest possible scale division or measurement distance, among other things, is determined by the focal length and by the resolution capability of the receiver. The greatest measurement distance $S_{max}$ is given by the following equation:

$$S_{max} = (f \cdot L_B)/(2 \cdot ov \cdot L_P) \quad (2),$$

where $L_P$ represents the magnitude of the receiver element, f is the focal length, and ov is the oversampling rate.

The limiting case for meeting the requirements of the sampling theorem occurs at ov=1.

The smallest measurement distance $S_{min}$ is given by the following equation:

$$S_{min} = (f \cdot k \cdot L_B)/(N_P \cdot L_P) \quad (3),$$

where $N_P$ is the number of receiver elements.

The ratio of maximum measurement distance to minimum measurement distance is given by the following equation:

$$V_s = N_P/(k \cdot 2 \cdot ov) \quad (4).$$

In order to increase this ratio, it would be necessary to reduce the number of bits or increase the number of receiver elements. According to equation (1), a reduction in the number of bits would result in a reduction in the length of the scale. An increased number of receiver elements results in an increase in the optical image field to be illuminated, which would require larger optical elements and stricter quality requirements. It is known from DE 3424806 that the ratio of maximum measurement distance to minimum measurement distance is brought about by a violation of the sampling theorem. The bit lengths are selected so as to be so small enough to result in a sufficiently small measurement distance. Since these small bars can no longer be resolved in a definite manner at the maximum measurement distance, code reading is carried out by means of an integral comparison operation between the scale imaged on the receiver and a stock of scale images stored in the evaluating device as a function of the measurement distance and section of the scale. This method is disadvantageous in that it requires prior information concerning the measurement distance obtained from the position of the focussing drive and the section of the scale which must be imaged must be greater than the actual length of a code.

A method for generating pseudostochastic random sequences for encoded measurement scales is described in EP 0441963. The pseudostochastic coding is effected by a CCD sensor or the like with a fixed imaging scale and is accordingly not suitable for application to geodetic devices.

WO 84/01027 describes a pseudostochastic random sequence as code for a scale with the object of achieving resolutions which are smaller than a coding element when carrying out measurements. For this purpose, a plurality of receiver elements of the receiving sensor are associated in a fixed manner with a coding element on the scale. This is also only a matter of interpolation with constant imaging ratios. The object of the invention is to provide a method for encoding a machine-readable scale so that a scale which has been encoded according to this method can be used for different measurement distances.

OBJECT AND SUMMARY OF THE INVENTION

The primary object of the invention is to provide a method for encoding a machine-readable scale in which the code can be read by machine accurately at different measurement distances.

This object is met according to the invention in that the ratio of maximum measurement distance to minimum measurement distance is increased without departing from the sampling theorem in that the bit length is changed depending on the measurement distance. This is effected in such a way that a scale with a biphase pseudostochastic code (BP code) is provided with an additional pseudostochastic code for measurements integrated in the vicinity of the biphase pseudostochastic code. In so doing, the bit length in the immediate measuring area is reduced resulting in a reduction of the code length of a number and accordingly in a reduction of the value $S_{min}$.

In order that this does not lead to a reduced length of the scale according to equation (1), the number of bits must be increased by 1 in this additional pseudostochastic code for the immediate measurement area. The improvement in the ratio from maximum to minimum measurement distance is accordingly given by the following equation:

$$V = \frac{2k}{k+1} \quad (5)$$

The minimum measurement distance is accordingly given by the following equation:

$$S_{min} = \frac{f(k+1) \cdot L_B}{2N_P \cdot L_P} \quad (6)$$

This additional code is formed in that the half-bits of a BP code which is formed from a pseudostochastic code of length k are compared with the bits of a pseudostochastic code (P code) of length k+1 with respect to color and, depending on whether or not the colors match, an additional bar of short length in the complementary color of the respective half-bit is placed in the center of the respective half-bit alternatively.

The invention will be explained more fully in the following with reference to an embodiment example.

BRIEF DESCRIPTION OF THE DRAWINGS AND TABLES

In the drawings and tables:

Table 1 shows a bit sequence of a P code with a length of 4 bits;

Table 2 shows a bit sequence of a P code with a length of 5 bits;

DESCRIPTION OF THE PREFERRED EMBODIMENTS

After appointing colors for the bit values of a P code of length k+1 and determining the allocation of the bit length to the bit significance of a BP code formed from a P code of length k, the bits with numbers n of the BP code of length k are juxtaposed with the bit with numbers 2n of the P code and their colors are compared.

If the color of the left-hand half-bit of the BP code of length k matches the color of the bit of the P code of length k+1, a bit of length ½ of the BP code of length k is placed in position 2n of the resulting code. If the color of the left-hand half-bit of the BP code of length k does not match the color of the bit of the P code of length k+1, a bit of length ½ of the BP code of length k and the color of the left-hand half-bit of the BP code of length k are placed in position 2n of the resulting code, a bar of the complementary color being arranged in the center of this new bit.

The method is then carried out in an analogous manner with all right-hand half-bits of bits with numbers n of the BP code of length k and the bit with numbers 2n+1 of the P code of length k+1. The bit formed by this juxtaposition is placed at position 2n+1 of the resulting code.

Alternatively, the method can also be used in such a way that a bar of the complementary color is arranged in the center of this new bit when the colors match.

The generator polynomials of the BP code of length k and those of the P code of length k+1 are advantageously selected from the group of valid generator polynomials in such a way that the portions of the scale where no additional bars in complementary colors have been set are small. Accordingly, there is a maximum bar density, which leads to an increase in the information content.

The bar density of the resulting code can be selected in such a way that the maximum measurement distance for the resulting code is somewhat greater than the minimum measurement distance of the BP code of length k so that an overlapping region is formed. When measurement distances are greater than the minimum measurement distance of the BP code of length k, the bars of the resulting code lie below the resolution limit of a receiver.

Table 1 shows a P code with a length of 4 bits with generator polynomial $y=1+x^1+x^4$ with the bit sequence and code values.

. Table 2 shows a P code with a length of 5 bits with generator polynomial $y=1+x^1+x^3+x^4+x^5$ with the bit sequence and code values.

Figure 1:
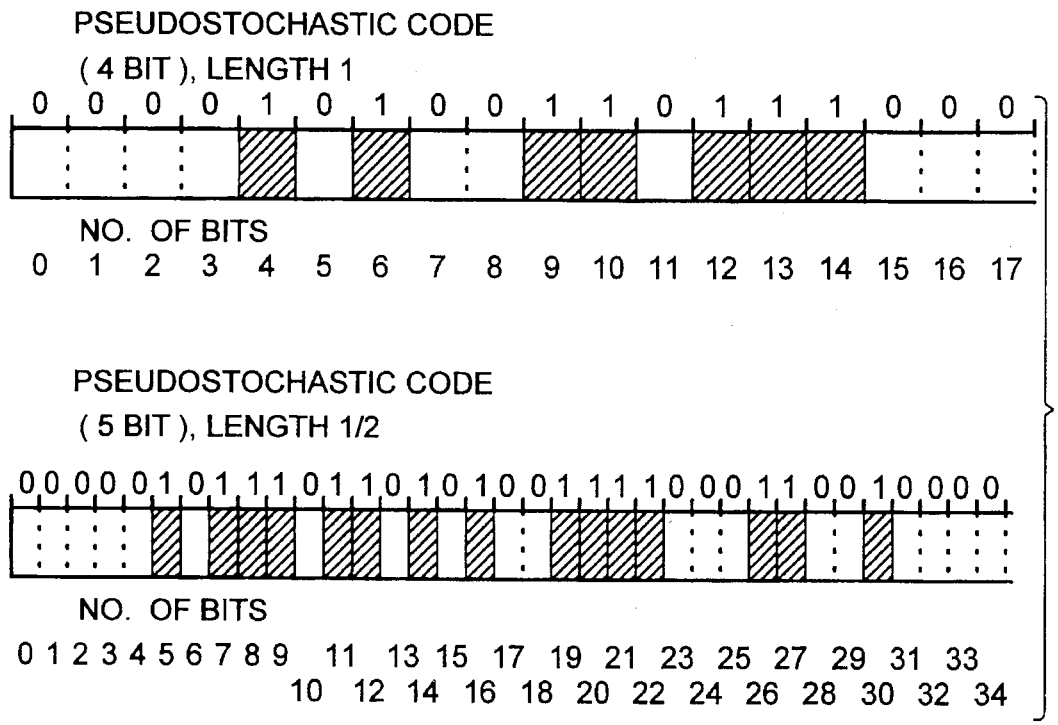
FIG. 1 shows the conversion of the contents of Table 1 and Table 2 to a scale.

In FIG. 1, the bit sequences shown in Tables 1 and 2 are converted into a scale. A light coloring is associated with every bit signifying 0 and a dark color is assigned to every bit signifying 1. In the 5-bit code, the bit length is ½.

Figure 2:
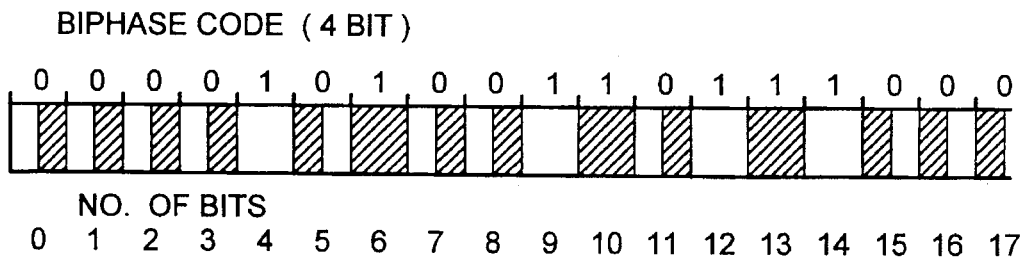
FIG. 2 shows conversions of the P code with a length of 4 bits into a BP code.

In FIG. 2, the pseudostochastic code with a length of 4 bits is converted to a BP code, wherein a half-bit with light color and a half-bit with dark color are assigned to bits with the value of 0 and the color changes at every bit boundary. A bit with the value of 1 is represented by a whole bit of length 1 in light and dark colors.

Figure 3:
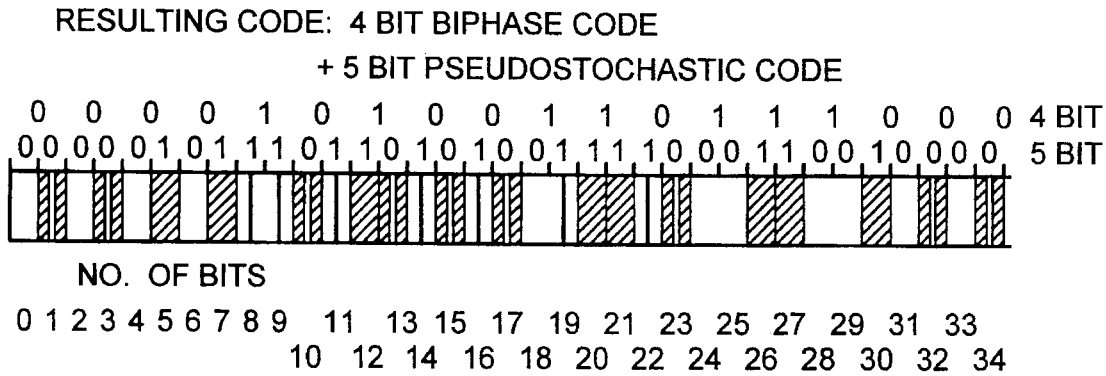
FIG. 3 shows a scale with resulting pseudostochastic coding.

FIG. 3 shows the code resulting from the color comparison between the half-bit of the BP code of length k and the bits of the P code with length k+1.

While the foregoing description and drawings represent the preferred embodiments of the present invention, it will be obvious to those skilled in the art that various changes and modifications may be made therein without departing from the true spirit and scope of the present invention.

TABLE 1

| bit number | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| bit | 0 | 0 | 0 | 0 | 1 | 0 | 1 | 0 | 0 | 1 | 1 | 0 | 1 | 1 | 1 | 0 | 0 | 0 |
| code value | 0 | 1 | 2 | 5 | 10 | 4 | 9 | 3 | 6 | 13 | 11 | 7 | 14 | 12 | 8 | | | |

TABLE 2

| bit number | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| bit | 0 | 0 | 0 | 0 | 0 | 1 | 0 | 1 | 1 | 1 | 0 | 1 | 1 | 0 | 1 | 0 | 1 | 0 |
| code value | 0 | 1 | 2 | 5 | 11 | 23 | 14 | 29 | 27 | 22 | 13 | 26 | 21 | 10 | 20 | 9 | 19 | 7 |
| bit number | 18 | 19 | 20 | 21 | 22 | 23 | 24 | 25 | 26 | 27 | 28 | 29 | 30 | 31 | 32 | 33 | 34 | |
| bit | 0 | 1 | 1 | 1 | 1 | 0 | 0 | 0 | 1 | 1 | 0 | 0 | 1 | 0 | 0 | 0 | 0 | |
| code value | 15 | 30 | 28 | 24 | 17 | 3 | 6 | 12 | 25 | 18 | 4 | 8 | 16 | | | | | |

What is claimed is:

1. A method for encoding a machine-readable scale using a BP-code which is formed from a first P-code with length k, said BP-code providing half bit pairs each having right- and left-half bits, said half bit pairs corresponding to whole bits of the first P-code, each of said bits being assigned light or dark coloring, said method comprising the steps of:

generating a second P-code having a length of k+1, said second P-code providing whole bits having dark and light coloring;

comparing the coloring of each half-bit of said BP-code with the coloring of whole bits of said second P-code based upon predetermined relationships to obtain first and second sets of comparison results;

assigning coloring to bits of said machine-readable scale based upon said first and second sets of comparison results according to predetermined guidelines.

2. The method of claim 4 wherein said predetermined relationships comprise:

comparing the coloring of the left-half bit of each half bit pair n of the BP-code to the coloring of the whole bit 2n of the second P-code to obtain said first set of comparison results; and comparing the coloring of the right-half bit of each half bit pair n of the BP-code to the coloring of the whole bit 2n+1 of the second P-code to obtain said second set of comparison results.

3. The method of claim 2 wherein said predetermined guidelines comprise:

selecting the coloring of bit 2n of said machine-readable scale to be the same as the coloring of the left-half bit of half bit pair n of the BP-code when the coloring of the left-half bit of half bit pair n of the BP-code matches the coloring of the whole bit 2n of the second P-code;

selecting the coloring of bit 2n of said machine-readable scale to be the same as the coloring of the left-half bit of half bit pair n of the BP-code when the coloring of the left-half bit of half bit pair n of the BP-code does not match the coloring of the whole bit 2n of the second P-code and positioning a bar having coloring opposite to the coloring of the of left-half bit of half bit pair n of the BP-code at a center of bit 2n of said machine-readable scale;

selecting the coloring of bit 2n+1 of said machine-readable scale to be the same as the coloring of the right-half bit of half bit pair n of the BP-code when the coloring of the right-half bit of half bit pair n of the BP-code matches the coloring of the whole bit 2n+1 of the second P-code; and, selecting the coloring of bit 2n+1 of said machine-readable scale to be the same as the coloring of the right-half bit of half bit pair n of the BP-code when the coloring of the right-half bit of half bit pair n of the BP-code does not match the coloring of the whole bit 2n+1 of the second P-code and positioning a bar having coloring opposite to the coloring of the of right-half bit of half bit pair n of the BP-code at a center of bit 2n+1 of said machine-readable scale.

4. The method of claim 2 wherein said predetermined guidelines comprise:

selecting the coloring of bit 2n of said machine-readable scale to be the same as the coloring of the left-half bit of half bit pair n of the BP-code when the coloring of the left-half bit of half bit pair n of the BP-code does not match the coloring of the whole bit 2n of the second P-code;

selecting the coloring of bit 2n of said machine-readable scale to be the same as the coloring of the left-half bit of half bit pair n of the BP-code when the coloring of the left-half bit of half bit pair n of the BP-code matches the coloring of the whole bit 2n of the second P-code and positioning a bar having coloring opposite to the coloring of the of left-half bit of half bit pair n of the BP-code at a center of bit 2n of said machine-readable scale;

selecting the coloring of bit 2n+1 of said machine-readable scale to be the same as the coloring of the right-half bit of half bit pair n of the BP-code when the coloring of the right-half bit of half bit pair n of the BP-code does not match the coloring of the whole bit 2n+1 of the second P-code; and, selecting the coloring of bit 2n+1 of said machine-readable scale to be the same as the coloring of the right-half bit of half bit pair n of the BP-code when the coloring of the right-half bit of half bit pair n of the BP-code matches the coloring of the whole bit 2n+1 of the second P-code and positioning a bar having coloring opposite to the coloring of the of right-half bit of half bit pair n of the BP-code at a center of bit 2n+1 of said machine-readable scale.

5. The method of claim 1 wherein said predetermined guidelines comprise:

selecting the coloring of bit 2n of said machine-readable scale to be the same as the coloring of the left-half bit of half bit pair n of the BP-code when the coloring of the left-half bit of half bit pair n of the BP-code matches the coloring of the whole bit 2n of the second P-code;

selecting the coloring of bit 2n of said machine-readable scale to be the same as the coloring of the left-half bit of half bit pair n of the BP-code when the coloring of the left-half bit of half bit pair n of the BP-code does not match the coloring of the whole bit 2n of the second P-code and positioning a bar having coloring opposite to the coloring of the of left-half bit of half bit pair n of the BP-code at a center of bit 2n of said machine-readable scale;

selecting the coloring of bit 2n+1 of said machine-readable scale to be the same as the coloring of the right-half bit of half bit pair n of the BP-code when the coloring of the right-half bit of half bit pair n of the BP-code matches the coloring of the whole bit 2n+1 of the second P-code; and, selecting the coloring of bit 2n+1 of said machine-readable scale to be the same as the coloring of the right-half bit of half bit pair n of the BP-code when the coloring of the right-half bit of half bit pair n of the BP-code does not match the coloring of the whole bit 2n+1 of the second P-code and positioning a bar having coloring opposite to the coloring of the of right-half bit of half bit pair n of the BP-code at a center of bit 2n+1 of said machine-readable scale.

6. The method of claim 1 wherein said predetermined guidelines comprise:

selecting the coloring of bit 2n of said machine-readable scale to be the same as the coloring of the left-half bit of half bit pair n of the BP-code when the coloring of the left-half bit of half bit pair n of the BP-code does not match the coloring of the whole bit 2n of the second P-code;

selecting the coloring of bit 2n of said machine-readable scale to be the same as the coloring of the left-half bit of half bit pair n of the BP-code when the coloring of the left-half bit of half bit pair n of the BP-code matches the coloring of the whole bit 2n of the second P-code and positioning a bar having coloring opposite to the coloring of the of left-half bit of half bit pair n of the BP-code at a center of bit 2n of said machine-readable scale;

selecting the coloring of bit 2n+1 of said machine-readable scale to be the same as the coloring of the right-half bit of half bit pair n of the BP-code when the coloring of the right-half bit of half bit pair n of the BP-code does not match the coloring of the whole bit 2n+1 of the second P-code; and, selecting the coloring of bit 2n+1 of said machine-readable scale to be the same as the coloring of the right-half bit of half bit pair n of the BP-code when the coloring of the right-half bit of half bit pair n of the BP-code matches the coloring of the whole bit 2n+1 of the second P-code and positioning a bar having coloring opposite to the coloring of the of right-half bit of half bit pair n of the BP-code at a center of bit 2n+1 of said machine-readable scale.

* * * * *